Dec. 28, 1954 W. P. BURTON 2,698,285
SEPARATION OF ORGANIC ACIDS BY AZEOTROPIC DISTILLATION
Filed May 28, 1949
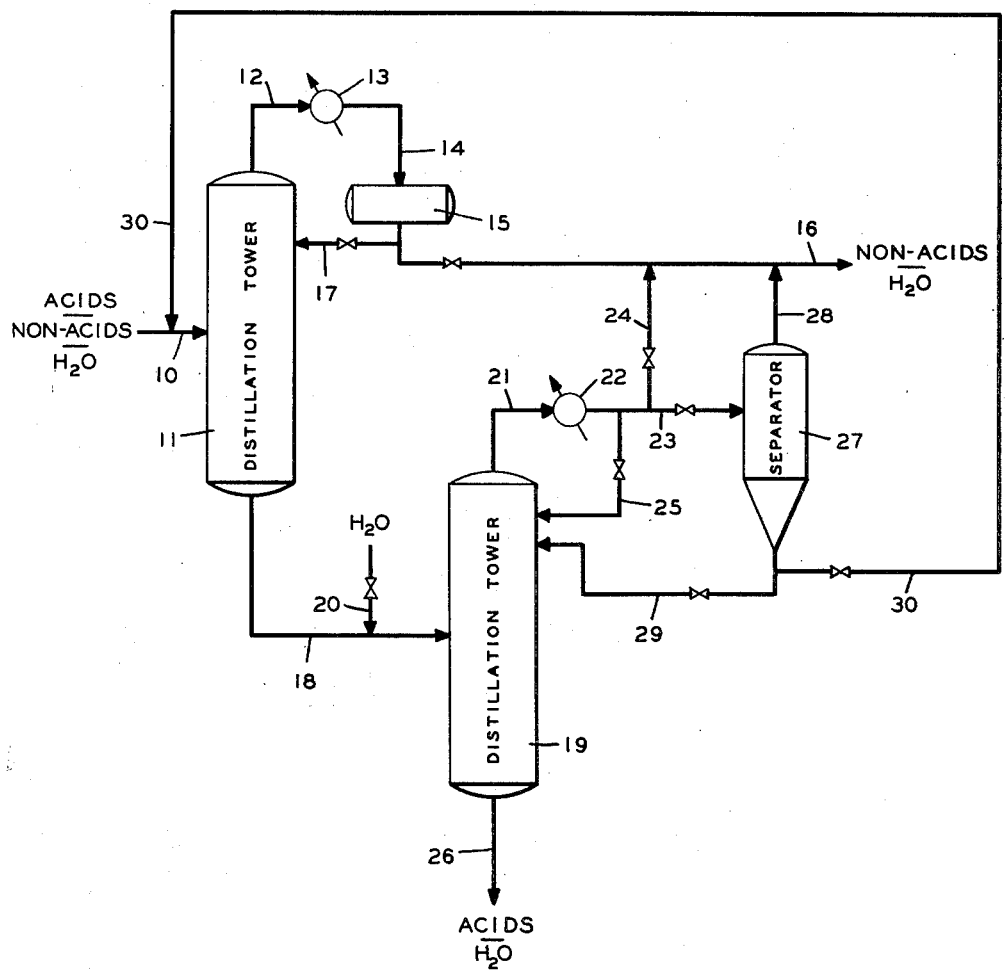
INVENTOR.
WILLIAM P. BURTON
BY E. F. Liebrecht
Benjamin I. Kaufman
ATTORNEYS United States Patent Office 2,698,285
Patented Dec. 28, 1954

2,698,285

SEPARATION OF ORGANIC ACIDS BY AZEOTROPIC DISTILLATION

William P. Burton, Orange, N. J., assignor to The M. W. Kellogg Company, Jersey City, N. J., a corporation of Delaware Application May 28, 1949, Serial No. 96,969

10 Claims. (Cl. 202—42)

This invention relates to the separation of organic compounds and relates more particularly to the separation of organic acids from mixtures comprising non-acid oxygenated organic compounds. Still more particularly, the invention relates to the separation of organic acids having from 2 to 6 carbon atoms per molecule from mixtures comprising these acids and alcohols and other non-acid oxygenated organic compounds having up to 6 carbon atoms per molecule.

It is known that aqueous mixtures comprising organic acids having from 2 to 6 carbon atoms per molecule and alcohols and other non-acid oxygenated organic compounds having from 1 to 6 carbon atoms per molecule as the principal acids and non-acids, may be separated by fractional distillation, in which the mixture is charged into a fractional distillation zone, with a substantial amount of water being present to prevent ester formation, to form a vapor phase and a liquid phase, alcohols and other non-acidics being removed as vapor and acids and the bulk of the water present being removed as a residue. In conducting the above-mentioned separation in a single distillation tower, it has been found that relatively high reflux ratios are required to separate the relatively heavier non-acid chemicals from the aqueous acid solution, the reflux ratio being defined as volumes of top or overhead reflux per volume of distillate product. This condition is encountered by reason that the relatively less water-soluble alcohols, that is, those having from 4 to 6 or higher carbon atoms per molecule, boil close to the acids being separated, as compared to the relatively low reflux ratios required for effecting separation between the acids and propanol and lower boiling alcohols. Thus, it has been found that a reflux ratio of at least 2:1 is required to separate non-acid chemicals from the aqueous acid solution in effecting fractional distillation of the aforementioned aqueous mixtures. In operating at a relatively high reflux ratio in the above-mentioned single stage fractional distillation, the relatively high heat requirements imposed on the single piece of equipment for obtaining high reflux and the necessity for employing a relatively large tower, makes such operation economically unattractive. It is highly desirable, therefore, to be able to effect separation between the aforementioned organic acids and non-acidics at a relatively lower reflux ratio and using proportionately smaller distillation equipment, and in this respect is particularly advantageous in effecting separation between organic acids and alcohols, together with other non-acid oxygenated organic compounds, present in the water product condensate obtained from the treatment of the reaction product produced in processes for the catalytic hydrogenation of oxides of carbon.

It is, therefore, an object of the present invention to provide for an improved method for the economic and efficient separation of organic acids having from 2 to 6 carbon atoms per molecule from mixtures comprising these acids and alcohols having up to 6 carbon atoms per molecule.

Another object of the invention is to provide for an improved method for the economic and efficient separation of organic acids having from 2 to 6 carbon atoms per molecule from fixtures comprising these acids and alcohols and other non-acid oxygenated organic compounds, having up to 6 carbon atoms per molecule.

Still another object of the invention is to provide for an improved method for the economic and efficient separation of organic acids and alcohols and other non-acid oxygenated organic compounds present in the water product condensate obtained from the treatment of the reaction product produced in processes for the catalytic hydrogenation of oxides of carbon.

Other objects and advantages inherent in the invention will be apparent to one skilled in the art from the following more detailed disclosure.

In accordance with the broad method of the present invention, an aqueous mixture comprising one or more organic acids having from 2 to 6 or more carbon atoms per molecule, and one or more alcohols having from 1 to 3 carbon atoms per molecule and one or more alcohols having from 4 to 6 or more carbon atoms per molecule, is subjected to a two-stage distillation in the presence of sufficient water to prevent esterification between acids and alcohols and to form the corresponding water azeotropes with alcohols present, as more fully hereinafter described, in which separation is effected between acids and alcohols (together with other non-acid oxygenated organic compounds if present in the mixture to be treated) at lower reflux ratios with a resulting reduction in the total heat requirement on the system than would be required in conducting the separation in a single distillation tower. Thus in one embodiment of the invention, relatively lower boiling chemicals in the feed mixture are taken overhead in the first distillation tower. A portion of these overheads is returned as reflux to the distillation tower. These chemicals in the overhead comprise alcohols and other non-acidics as high boiling as propanol, while the bottoms from this distillation tower comprise substantially all of the acids present, and which may also contain the relatively water-insoluble alcohols and other non-acidics having from 4 to 6 carbon atoms per molecule. The bottoms thus obtained from the first distillation tower are next fed to a second distillation tower, in the presence of sufficient water to prevent esterification between acids and alcohols in the distillation tower, where alcohols and other non-acidics are taken overhead as their water azeotropes, while an aqueous mixture of the acids is recovered as bottoms. These water azeotropes may be removed as such, with a portion thereof returned to the distillation tower as reflux, or, in another modification of the present embodiment of the method of the invention, may be subjected to phase separation in which an upper phase comprising chiefly water-insoluble alcohols and other non-acidics and a lower water-rich phase comprising water-insoluble alcohols and other non-acidics in minor proportion, is formed. This upper phase may be recovered as such, while the lower water-rich phase is returned as reflux to the second distillation step. In conducting the two-stage distillation as indicated above, it is desirable to operate the first distillation tower under such conditions of temperature and pressure that substantially all of the propanol and other lower boiling non-acidics, if the latter are present in the original feed mixture, are taken overhead so that the bottoms from this distillation tower when subjected to the aformentioned fractionation in the second distillation tower, will be separated as overhead water azeotropes of $C_4$ to $C_6$ or higher non-acidics and aqueous acid bottoms. The aforementioned phase separation of the water azeotropes thus recovered, may be omitted if so desired. However, where the distillation in the first tower is so conducted that not all of the propanol present in the feed mixture is recovered in the overheads from this tower but rather a portion thereof is also taken with the organic acids and relatively water-insoluble $C_4$ to $C_6$ or higher non-acidics in the bottoms, the aforementioned phase separation of the resulting water azeotropes from the second distillation step is employed in order to recover propanol present in the resulting water-rich phase, a portion of which is returned to the second distillation tower for reflux, as previously indicated. The mutual solubility of propanol in each layer resulting from the abovementioned phase separation of the water azeotropes recovered as overheads from the second distillation tower, has been found to result in a build-up of propanol in the system, arising from the reflux of the water-rich phase to the second distillation tower. In such event, in another modification of the embodiment of the invention, a bleed is taken from the returned layer to this distillation tower which carries the water-rich phase thereto as reflux. This bleed line is recycled to the first distillation step, and a build-up of propanol in the system is thus prevented.

In conducting the two-stage distillation, as described above, it has been found that far lower total reflux ratios are required in conducting the fractionation of acids from non-acidics than are required in conducting the fractionation in a single distillation tower. This condition is found to exist by reason that in conducting the two-stage distillation of the present invention, the relatively lighter chemicals boiling through propanol may be taken overhead in the first distillation tower at a lower reflux ratio such as 0.5:1, while the remaining non-acidics fractionated from the bottoms which are fed to the second distillation tower, are recovered at a relatively higher reflux ratio such as 1:1 or 2:1. This is particularly advantageous in effecting separation of alcohols and other non-acidics from organic acids present in the aforementioned water product condensate obtained from the treatment of the reaction product produced in processes for the catalytic hydrogenation of oxides of carbon. In this water product condensate the relatively lower boiling chemicals, for example, those boiling through propanol, constitute the greater proportion of the non-acid compounds present, and may comprise 90% or more of the total non-acid chemicals present in this product. Thus it is particularly desirable to be able to operate the first distillation tower at a relatively low reflux ratio such as 0.5:1, even though the reflux ratio for the remaining chemicals in the second stage is relatively higher. The total reflux ratios thus employed, have been found to impose far lower heat requirements on the two-stage system, than if a single distillation step were employed and which has been found to necessitate a reflux ratio of at least 2:1 in order to permit complete separation of acids from non-acidics.

The accompanying drawing illustrates diagrammatically one form of the apparatus employed and capable of carrying out one embodiment of the process of the present invention. While the invention will be described in detail by reference to the embodiment illustrated in the drawing, it will be noted that it is not intended that it be limited thereto but is capable of other embodiments which may extend beyond the scope of the apparatus employed. Furthermore, the distribution and circulation of liquids and vapors is illustrated in the drawing by diagrammatic representations of the apparatus employed. Some of the mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by one skilled in the art.

Referring to the drawing, a feed comprising an aqueous mixture of organic acids having from 2 to 6 carbon atoms per molecule and alcohols and other non-acid oxygenated organic compounds having from 1 to 6 carbon atoms per molecule is introduced through line 10 to a fractional distillation zone, represented by distillation tower 11. This feed may comprise a water condensate product obtained from the treatment of the reaction product produced in processes for the catalytic hydrogenation of oxides of carbon, or may comprise the aforementioned water condensate product in admixture with an extract of relatively water-soluble organic acids, alcohols and other non-acidics obtained from the treatment of the oil condensate product produced in the aforementioned catalytic hydrogenation. Thus the feed in line 10 may comprise an aqueous mixture of acetic and higher boiling acids through hexanoic acid, methanol and higher boiling alcohols through hexanol, and non-acid oxygenated organic compounds such as aldehydes (e. g., acetaldehyde, propionaldehyde, butyraldehyde), ketones (e. g., acetone, methyl ethyl ketone, methyl propyl ketone), and esters (e. g., methyl acetate, ethyl acetate, ethyl propionate), with sufficient water being present in order to avoid esterification between acids and alcohols in this tower and to form the corresponding water azeotropes with non-acidics present. Tower 11 is operated under proper conditions of temperature and pressure effective to distill overhead those non-acidics which are not higher boiling than propanol, and which in the present embodiment of the invention, may comprise methanol, ethanol and propanol as their azeotropes, as well as other non-acidics, such as aldehydes, ketones and esters (e. g., acetaldehyde, propionaldehyde, acetone, methyl ethyl ketone, ethyl acetate), boiling or azeotroping within this range. The overheads from tower 11 are transferred as vapors through line 12 to a condenser 13. Condenser 13 is provided to liquefy the vaporized mixture transferred from tower 11 through line 12. The mixture of alcohols and other non-acidics in this condenser is transferred from condenser 13, through line 14 to a reflux drum 15. From drum 15 the non-acidics thus condensed are withdrawn as an aqueous mixture through valved-line 16 for further use or treatment outside the scope of the present process. A portion of the aforementioned mixture is also transferred from line 16, via valved-line 17 with which line 16 connects, into tower 11 as reflux.

The lower relatively high boiling fraction in tower 11 will comprise acetic and higher boiling acids through hexanoic acid, butanol and higher boiling alcohols through hexanol, and other non-acidics higher boiling than propanol such as aldehydes (e. g., caproaldehyde), ketones (e. g., methyl butyl ketone), esters (e. g., ethyl butyrate). These compounds are withdrawn as aqueous bottoms from tower 11 through line 18. This aqueous mixture is next transferred through line 18 to a second fractional distillation zone, represented by distillation tower 19. In order to avoid esterification between acids and alcohols in tower 19 and to form the corresponding water azeotropes of non-acidics present, in the event that insufficient water is present in line 18, additional quantities of water may be introduced into line 18 through valved-line 20, with which line 18 connects. Tower 19 is operated under proper conditions of temperature and pressure effective to distill overhead substantially all of the $C_4$ to $C_6$ or higher alcohols and other non-acidics as their water azeotropes, present in line 18, and which are lower boiling than the remaining $C_2$ to $C_6$ or higher acids. The overhead azeotropes from tower 19 are transferred as vapors through line 21 to a condenser 22. Condenser 22 is provided to liquefy the vaporized azeotropic mixtures transferred from tower 19 through line 21. The azeotropic mixtures thus condensed and comprising the aforementioned alcohols and non-acidics are withdrawn from condenser 22 through valved-line 23 for further use or treatment outside the scope of the present process, or conveniently, if so desired, may be transferred from line 23 via valved-line 24 into line 16 and thus combined with the aforementioned non-acidics in this line and then withdrawn as a product of the process. A portion of the aforementioned mixture in line 23 is also transferred from line 23, via valved-line 25 with which line 23 connects, into tower 19 as reflux. Bottoms from tower 19, comprising an aqueous mixture of $C_2$ to $C_6$ acids, are withdrawn through line 26 as a product of the process for further use or treatment if so desired.

It should be noted that the overheads from tower 19 may be condensed and subjected to phase separation in order to essentially dehydrate the non-acidics present. The distillation in tower 11 may be so conducted that it is not practical to recover in the resulting overhead substantially all of the propanol present in the feed mixture introduced into tower 11 through line 10, but rather a portion of the propanol present is also taken with the organic acids and higher boiling non-acidics in the aqueous bottoms obtained from this tower. In such event, the previously referred to phase separation of the condensed overheads from tower 19, in another modification of the present embodiment of the invention, containing propanol-water azeotropes as additional components, are transferred directly through line 23 to a separator 27. In separator 27 as a result of settling action, there is formed an upper phase comprising $C_4$ to $C_6$ or higher alcohols and other relatively water-insoluble non-acidics in major proportion and water, and a lower water-rich phase comprising $C_4$ to $C_6$ alcohols and other relatively water-insoluble non-acidics in minor proportion. Propanol is also present in each of the aforementioned layers or phases, as a result of the mutual solubility thereof in each phase. The upper phase from separator 27 is withdrawn through line 28 and may be transferred into line 16, with which line 28 connects, and thus combined with the aforementioned non-acidics in this line and then withdrawn as a product of the process. The lower water-rich phase from separator 27 is withdrawn through valved-line 29 and returned through this line to tower 19 as reflux.

The aforementioned mutual solubility of propanol in the aforementioned upper and lower phases in separator 27, has been found to result in a build-up of propanol in the system, thus effecting its operability. In order to overcome this factor, a bleed is taken from the returned lower layer to tower 19 as reflux. For this purpose the bleed is taken through valved-line 30, with which line 29 connects, and a portion of the lower layer from separator 27 is thus transferred through line 30 to the feed in line 10, with which line 30 connects. A build-up of propanol in the system is thus prevented.

The following example indicates comparative results obtained in utilizing the two-stage distillation method of the present invention and the results obtained with conventional single-stage distillation apparatus. It should be noted however, that the example is included only for the purposes of illustration and is not intended in any way to unduly limit the process of the invention.

*Example*

Employing the two-stage distillation apparatus illustrated in the drawing, a water condensate product obtained from the condensation of the reaction effluent produced by the hydrogenation of carbon monoxide (in a ratio of 1.5 parts hydrogen and 1 part carbon monoxide in the presence of an alkalized iron catalyst similar in composition to an ammonia synthesis catalyst) was introduced into the first distillation tower (tower 11 in the drawing). This water condensate product contained fatty acids boiling from acetic through hexanoic acids, alcohols boiling from methanol through hexanol, and other non-acids comprising aldehydes, ketones and esters higher and lower boiling than propanol. Primary tower 11 into which this aqueous mixture was introduced, comprised a 1 inch diameter column having 31 inches of packed section below the feed point and 5 perforated plates above the feed point. This column was operated at a top temperature of approximately 85° C., a bottom temperature of approximately 99.5° C., and a reflux ratio of 0.67. The overhead distillate was found to be approximately 7.5 per cent of the feed, having an acidity of approximately 3.8 milliequivalents per 100 ml. The bottoms from this column were found to contain 0.046 milliequivalent per gram of non-acid materials, which would result in impure acids if further removal were not obtained. The second distillation tower (tower 19 in the drawing), similar in construction to tower 11 employed in the primary distillation, was operated at a top temperature of approximately 96.5° C. and a bottom temperature of approximately 99.8° C. The total overhead, i. e., distillate and reflux, was found to be 3.2 per cent of the feed. The bottoms product from this secondary distillation contained 0.019 milliequivalent per gram of non-acids, which was found to be of such concentration as would allow simple purification to be made of the recovered acids.

For comparative purposes, the above-mentioned feed was charged to a single distillation column, having a 1 inch diameter with 63 inches of packed section below the feed point and 30 perforated plates above the feed point. This tower was operated at a top temperature of approximately 85° C., a bottom temperature of approximately 100.5° C., and a reflux ratio of 2.33. The overhead distillate was found to contain 8 per cent of the feed with an acidity of 5.6 milliequivalents per 100 ml. The bottoms product from this distillation was found to contain 0.025 milliequivalent per gram of non-acids.

From the above data the relative heat input may be found by calculating the total chemicals distilled, i. e., overhead product plus reflux, for each case. With the preliminary distillation tower operated at a 7.5 percent take-off, and 0.67 reflux ratio, it is found that 12.5 per cent of the feed was distilled. Adding to this the 3.2 per cent quantity distilled in the second tower of the remaining 92.5 per cent of the original feed, it is found that the total distillate for the combined operation is 15.5 per cent of the original feed. For the conventional single-tower operation, the aforementioned 8 per cent take-off at 2.33 reflux ratio, indicates that 26.6 per cent of the feed was being distilled overhead. It will be noted that by feeding the bottoms from the primary distillation tower, in the two-stage distillation method of the present invention, to the second tower without cooling, the use of two columns would not increase the quantity of sensible heat needed for preheating of the feed.

While a particular embodiment of the invention has thus been described for purposes of illustration, it should be understood that various modifications or adaptations thereof, which will be obvious to one skilled in the art, may be made within the spirit of the invention as set forth in the appended claims.

Having thus described my invention, I claim:

1. A method for separating organic acids higher boiling than propanol from an aqueous mixture containing non-acid oxygenated organic compounds not higher boiling and non-acid oxygenated organic compounds higher boiling than propanol and capable of forming water-azeotropes, said mixture having been obtained as a water-product condensate produced by the catalytic hydrogenation of oxides of carbon, which comprises: in a first distillation tower, distilling said mixture in the presence of sufficient water to prevent esterification to obtain a low-boiling fraction comprising non-acid oxygenated organic compounds not higher boiling than propanol and a high-boiling fraction consisting essentially of organic acids and non-acid oxygenated organic compounds higher boiling than propanol; withdrawing each of said fractions from said distillation tower; in a second distillation tower, distilling said high-boiling fraction in the presence of sufficient water to prevent esterification to obtain a high-boiling fraction comprising organic acids and a low-boiling fraction comprising water-azeotropes of non-acid oxygenated organic compounds; withdrawing each of said last-mentioned fractions from said second distillation tower; and refluxing during each of said distillation steps.

2. A method for separating organic acids higher boiling than propanol from an aqueous mixture containing alcohols and other non-acid oxygenated organic compounds not higher boiling and alcohols and other non-acid oxygenated organic compounds higher boiling than propanol and capable of forming water-azeotropes, said mixture having been obtained as a water-product condensate produced by the catalytic hydrogenation of oxides of carbon, which comprises: in a first distillation tower, distilling said mixture in the presence of sufficient water to prevent esterification to obtain a low boiling fraction comprising non-acid oxygenated organic compounds not higher boiling than propanol and a high-boiling fraction consisting essentially of organic acids and non-acid oxygenated organic compounds higher boiling than propanol; withdrawing each of said fractions from said distillation tower; in a second distillation tower, distilling said high-boiling fraction in the presence of sufficient water to prevent esterification to obtain a high-boiling fraction comprising organic acids and a low-boiling fraction comprising water-azeotropes of non-acid oxygenated organic compounds; withdrawing each of said last-mentioned fractions from said second distillation tower; and refluxing during each of said distillation steps.

3. The method for separating organic acids higher boiling than propanol from an aqueous mixture containing non-acid oxygenated organic compounds not higher boiling and non-acid oxygenated organic compounds higher boiling than propanol and capable of forming water-azeotropes, said mixture having been obtained as a water-product condensate produced by the catalytic hydrogenation of oxides of carbon, which comprises: in a first distillation tower, distilling said mixture in the presence of sufficient water to prevent esterification to obtain a low-boiling fraction comprising non-acid oxygenated organic compounds not higher boiling than propanol and a high-boiling fraction consisting essentially of organic acids and non-acid oxygenated organic compounds higher boiling than propanol; withdrawing each of said fractions from said distillation tower; in a second distillation tower, distilling said high-boiling fraction in the presence of sufficient water to prevent esterification to obtain a high-boiling fraction comprising organic acids and a low-boiling fraction comprising water-azeotropes of non-acid oxygenated organic compounds; withdrawing each of said last-mentioned fractions from said second distillation tower; separating said azeotropes into an upper phase and a lower water-rich phase, each of said phases comprising non-acid oxygenated organic compounds; returning a portion of said water-rich phase to at least one of said distillation towers; and refluxing during each of said distillation steps.

4. A method for separating organic acids higher boiling than propanol from an aqueous mixture containing non-acid oxygenated organic compounds not higher boiling and non-acid oxygenated organic compounds higher boiling than propanol and capable of forming water-azeotropes, said mixture having been obtained as a water-product condensate produced by the catalytic hydrogenation of oxides of carbon, which comprises: in a first distillation tower, distilling said mixture in the presence of sufficient water to prevent esterification to obtain a low-boiling fraction comprising non-acid oxygenated organic compounds not higher boiling than propanol and a high-boiling fraction consisting essentially of organic acids and non-acid oxygenated organic compounds higher boiling than propanol; withdrawing each of said fractions from said distillation tower; in a second distillation tower, distilling said high-boiling fraction in the presence of sufficient water to prevent esterification to obtain a high-boiling fraction comprising organic acids and a low-boiling fraction comprising water-azeotropes of non-acid oxygenated organic compounds; withdrawing each of said last-mentioned fractions from said second distillation tower; separating said azeotropes into an upper phase and a lower water-rich phase, each of said phases comprising non-acid oxygenated organic compounds; returning a portion of said water-rich phase to said first distillation tower; and refluxing during each of said distillation steps.

5. A method for separating organic acids higher boiling than propanol from an aqueous mixture containing non-acid oxygenated organic compounds not higher boiling and non-acid oxygenated organic compounds higher boiling than propanol and capable of forming water-azeotropes, said mixture having been obtained as a water-product condensate produced by the catalytic hydrogenation of oxides of carbon, which comprises: in a first distillation tower, distilling said mixture in the presence of sufficient water to prevent esterification to obtain a low-boiling fraction comprising non-acid oxygenated organic compounds not higher boiling than propanol and a high-boiling fraction consisting essentially of organic acids and non-acid oxygenated organic compounds higher boiling than propanol; withdrawing each of said fractions from said distillation tower; in a second distillation tower, distilling said high-boiling fraction in the presence of sufficient water to prevent esterification to obtain a high-boiling fraction comprising organic acids and a low-boiling fraction comprising water-azeotropes of non-acid oxygenated organic compounds; withdrawing each of said last-mentioned fractions from said second distillation tower; separating said azeotropes into an upper phase and a lower water-rich phase, each of said phases comprising non-acid oxygenated organic compounds; returning a portion of said water-rich phase to said second distillation tower; and refluxing during each of said distillation steps.

6. A method for separating organic acids higher boiling than propanol from an aqueous mixture containing alcohols and other non-acid oxygenated organic compounds not higher boiling and alcohols and other non-acid oxygenated organic compounds higher boiling than propanol and capable of forming water-azeotropes, said mixture having been obtained as a water-product condensate produced by the catalytic hydrogenation of oxides of carbon, which comprises: in a first distillation tower, distilling said mixture in the presence of sufficient water to prevent esterification to obtain a low-boiling fraction comprising non-acid oxygenated organic compounds not higher boiling than propanol and a high-boiling fraction consisting essentially of organic acids and non-acid oxygenated organic compounds higher boiling than propanol; withdrawing each of said fractions from said distillation tower; in a second distillation tower, distilling said high-boiling fraction in the presence of sufficient water to prevent esterification to obtain a high-boiling fraction comprising organic acids and a low-boiling fraction comprising water-azeotropes of non-acid oxygenated organic compounds; withdrawing each of said last-mentioned fractions from said second distillation tower; separating said azeotropes into an upper phase and a lower water-rich phase, each of said phases comprising non-acid oxygenated organic compounds; returning a portion of said water-rich phase to at least one of said distillation towers; and refluxing during each of said distillation steps.

7. A method for separating organic acids having from 2 to 6 carbon atoms per molecule from an aqueous mixture containing propanol and higher and lower boiling and non-acid oxygenated organic compounds having from 1 to 6 carbon atoms per molecule, which comprises: in a first distillation tower, distilling said mixture in the presence of sufficient water to prevent esterification to obtain a low-boiling fraction comprising propanol and lower boiling non-acid oxygenated organic compounds and a high-boiling fraction consisting essentially of organic acids, propanol, and higher boiling non-acid oxygenated organic compounds; withdrawing each of said fractions from said distillation tower; in a second distillation tower, distilling said high-boiling fraction in the presence of sufficient water to prevent esterification to obtain a high-boiling fraction comprising organic acids and a low-boiling fraction comprising water-azeotropes of non-acid oxygenated organic compounds; withdrawing each of said last-mentioned fractions from said second distillation tower; separating said azeotropes into an upper phase comprising non-acid oxygenated organic compounds having from 4 to 6 carbon atoms per molecule and a lower water-rich phase comprising propanol; returning a portion of said water-rich phase to at least one of said distillation towers; and refluxing during each of said distillation steps.

8. A method for separating organic acids having from 2 to 6 carbon atoms per molecule from an aqueous mixture containing propanol and higher and lower boiling and non-acid oxygenated organic compounds having from 1 to 6 carbon atoms per molecule, which comprises: in a first distillation tower, distilling said mixture in the presence of sufficient water to prevent esterification to obtain a low-boiling fraction comprising propanol and lower boiling non-acid oxygenated organic compounds and a high-boiling fraction consisting essentially of organic acids, propanol, and higher boiling non-acid oxygenated organic compounds; withdrawing each of said fractions from said distillation tower; in a second distillation tower, distilling said high-boiling fraction in the presence of sufficient water to prevent esterification to obtain a high-boiling fraction comprising organic acids and a low-boiling fraction comprising water-azeotropes of non-acid oxygenated organic compounds; withdrawing each of said last-mentioned fractions from said second distillation tower; separating said azeotropes into an upper phase comprising non-acid oxygenated organic compounds having from 4 to 6 carbon atoms per molecule and a lower water-rich phase comprising propanol; returning a portion of said water-rich phase to said first distillation tower; and refluxing during each of said distillation steps.

9. A method for separating organic acids having from 2 to 6 carbon atoms per molecule from an aqueous mixture containing propanol and higher and lower boiling and non-acid oxygenated organic compounds having from 1 to 6 carbon atoms per molecule, which comprises: in a first distillation tower, distilling said mixture in the presence of sufficient water to prevent esterification to obtain a low-boiling fraction comprising propanol and lower boiling non-acid oxygenated organic compounds and a high-boiling fraction consisting essentially of organic acids, propanol, and higher boiling non-acid oxygenated organic compounds; withdrawing each of said fractions from said distillation tower; in a second distillation tower, distilling said high-boiling fraction in the presence of sufficient water to prevent esterification to obtain a high-boiling fraction comprising organic acids and a low-boiling fraction comprising water-azeotropes of non-acid oxygenated organic compounds; withdrawing each of said last-mentioned fractions from said second distillation tower; separating said azeotropes into an upper phase comprising non-acid oxygenated organic compounds having from 4 to 6 carbon atoms per molecule and a lower water-rich phase comprising propanol; returning a portion of said water-rich phase to said second distillation tower; and refluxing during each of said distillation steps.

10. A method for separating organic acids having from 2 to 6 carbon atoms per molecule from an aqueous mixture containing higher and lower boiling non-acid oxygenated organic compounds having from 1 to 6 carbon atoms per molecule, said higher boiling non-acid compounds being capable of forming water-azeotropes, which comprises: in a first distillation tower, distilling said mixture in the presence of sufficient water to prevent esterification to obtain a low-boiling fraction comprising non-acid oxygenated organic compounds having from 1 to 3 carbon atoms per molecule and a high-boiling fraction consisting essentially of organic acids and non-acid oxygenated organic compounds having from 3 to 6 carbon atoms per molecule; withdrawing each of said fractions from said distillation tower; in a second distillation tower, distilling said high-boiling fraction in the presence of sufficient water to prevent esterification to obtain a high-boiling fraction comprising organic acids and a low-boiling fraction comprising water-azeotropes of non-acid oxygenated organic compounds; withdrawing each of said last-mentioned fractions from said second distillation tower; separating said azeotropes into an upper phase comprising non-acid oxygenated organic compounds having from 4 to 6 carbon atoms per molecule and a lower water-rich phase comprising non-acid oxygenated organic compounds having 3 carbon atoms per molecule; returning a portion of said water-rich phase to at least one of said distillation towers; and refluxing during each of said distillation steps.

References Cited in the file of this patent

UNITED STATES PATENTS

| Number | Name | Date |
|---|---|---|
| 2,204,652 | Bludworth | June 18, 1940 |
| 2,324,755 | Beamer | July 20, 1943 |
| 2,438,300 | Schniepp | Mar. 23, 1948 |
| 2,457,257 | Michael | Dec. 28, 1948 |
| 2,476,788 | White | July 19, 1949 |
| 2,523,248 | Heinze et al. | Sept. 19, 1950 |
| 2,533,675 | Marschner | Dec. 17, 1950 |

OTHER REFERENCES

Robinson, "Elements of Fractional Distillation," second edition, published 1930 by McGraw-Hill Book Company, New York, New York, pages 133–138.